United States Patent [19]

Onori

[11] Patent Number: 5,226,846

[45] Date of Patent: Jul. 13, 1993

[54] SOUND PRODUCING DEVICE FOR USE ON A BICYCLE

[76] Inventor: James J. Onori, 3105 Maple Dr., Davie, Fla. 33328

[21] Appl. No.: 895,016

[22] Filed: Jun. 8, 1992

[51] Int. Cl.$^5$ .................................... A63H 5/00
[52] U.S. Cl. ........................................ 446/404
[58] Field of Search ............ 446/404, 405, 397, 408, 446/409, 415, 418, 421; 24/520, 507

[56] References Cited

U.S. PATENT DOCUMENTS

| | | | |
|---|---|---|---|
| 595,334 | 12/1897 | Paehtz | 446/404 X |
| 2,736,136 | 2/1956 | Modlin | 446/404 |
| 2,768,474 | 10/1956 | Harvey | 446/404 |
| 2,874,514 | 2/1959 | Munro | 446/404 |
| 3,097,447 | 7/1963 | Peham et al. | 446/404 |
| 3,349,453 | 10/1967 | Lida et al. | 24/507 X |
| 3,905,151 | 9/1975 | Zweigle | 446/404 |
| 4,005,510 | 2/1977 | Noda | 24/507 X |
| 4,084,299 | 4/1978 | Noda | 24/507 X |
| 4,735,592 | 4/1988 | Griffin | 446/404 |

Primary Examiner—Robert A. Hafer
Assistant Examiner—D. Neal Muir
Attorney, Agent, or Firm—Malloy & Malloy

[57] ABSTRACT

A sound producing device, to be attached to the frame of a bicycle adjacent the wheels, the device including a clamp member having a pair of clamp arms, each arm including a clamp head and a handle portion at opposite ends thereof, and being hingedly attached to one another at respective mid-sections thereof such that a biasing force exerted on the clamp arms will push the clamp heads towards one another requiring that a compressing force be exerted on the handle portions in order to pull the clamp heads apart when engaging or disengaging the device. Located in an interior of each of the clamp heads is a gripper insert which is formed of a high friction, deformable material such that the clamp member will not slip or rotate about the frame of the bicycle during use, and such that frames of varying dimensions may be completely engaged by the gripper inserts, thereby enabling rigid, yet flexible flaps protruding from a distal end of clamp arms to contact the moving spokes of the bicycle wheel resulting in the generation of a motor-like sound.

11 Claims, 2 Drawing Sheets

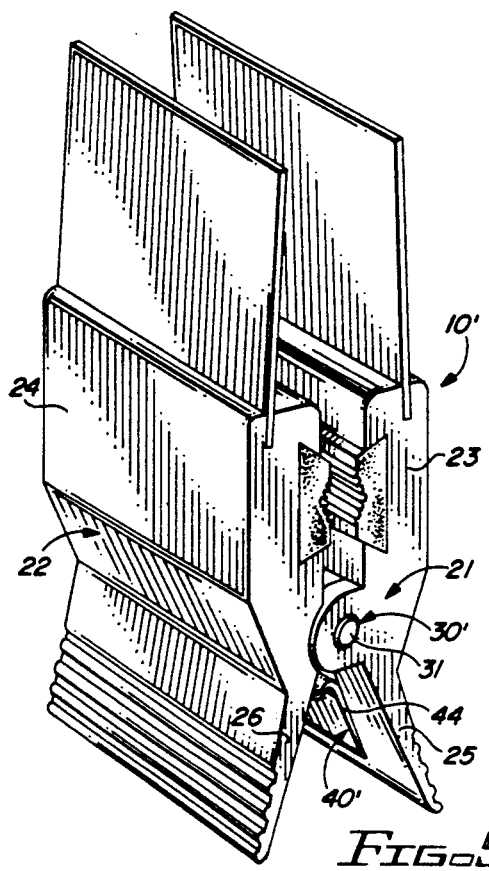
FIG. 5
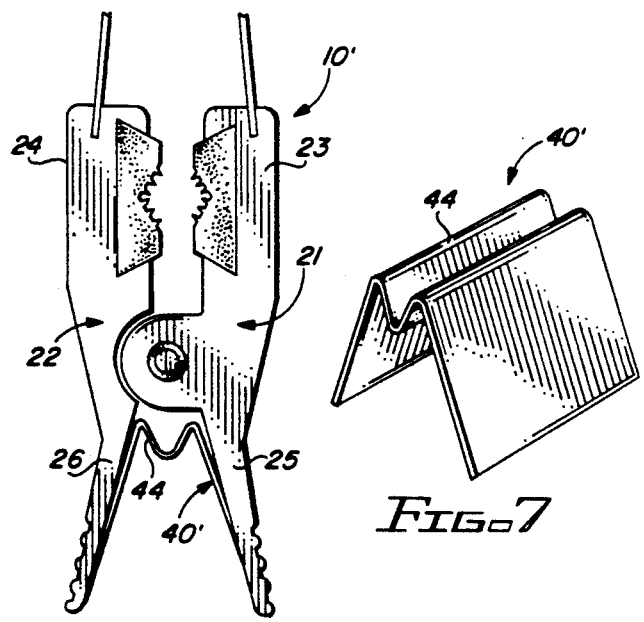
FIG. 6
FIG. 7
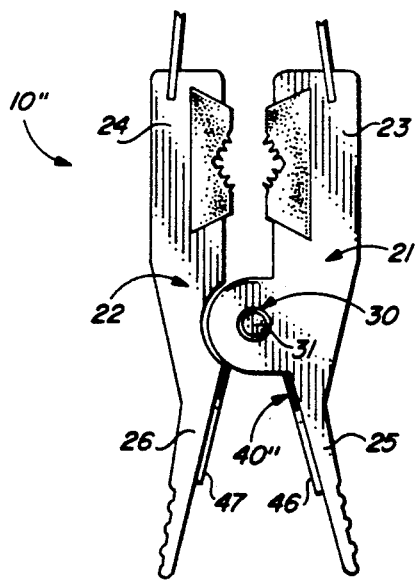
FIG. 9
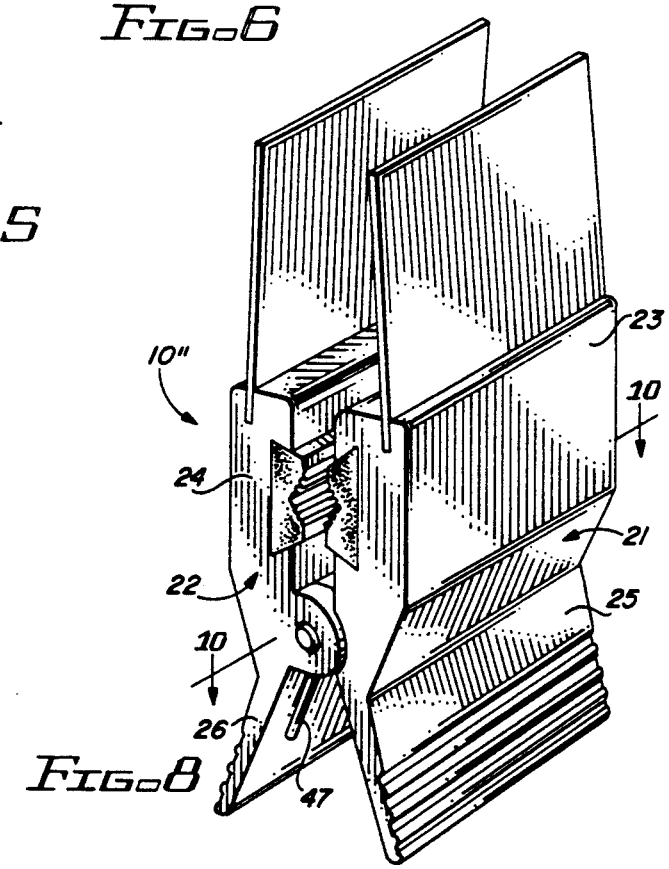
FIG. 8
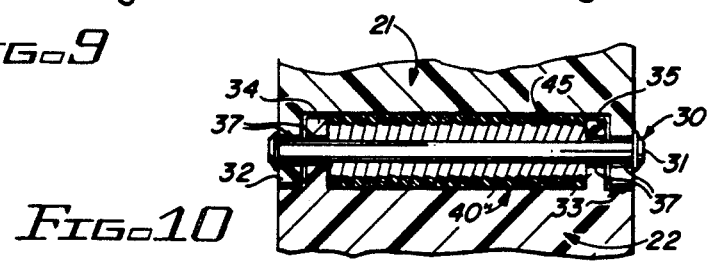
FIG. 10

SOUND PRODUCING DEVICE FOR USE ON A BICYCLE

BACKGROUND OF THE INVENTION

1. Field of the Invention

The present invention is directed towards a sound producing device, to be attached to the frame of a bicycle, which can be easily and safely attached or disattached and will remain in a fixed position during use, thereby providing a user with an enjoyable and easily utilized means of simulating a motor-like noise during bicycle riding.

2. Description of the Prior Art

For a long time, children have attached baseball cards and the like to their bicycle frames, such that when they ride their bicycles, the spokes on the tires contact the card making a motor-like noise. Accordingly, there have been many inventions in the past designed to utilize the movement of a bicycle to make noise. The majority of the inventions, such as the devices recited by Frew, U.S. Pat. No. 2,633,097, Rutledge, U.S. Pat. No. 4,018,450, Tucker, U.S. Pat. No. 4,151,677, Barthel, U.S. Pat. No. 2,914,886, Richter, U.S. Pat. No. 3,131,507, include complicated and elaborate designs utilizing clappers, sound boxes, support frames, and the like. These devices are primarily of a permanent nature and once installed are not to be removed. Further, some simpler designs such as those recited in Sorensen, et al., U.S. Pat. No. 5,085,611, Modlin, U.S. Pat. No. 2,736,136, and Zweigle, U.S. Pat. No. 3,905,151, which while including simpler designs, are nonetheless difficult to install. These various devices are particularly difficult to install by children who will be the primary users of such items. More particularly, the device of Modlin includes a metallic piece with interlocking clamps which require substantial pressure to install, include potentially dangerous sharp edges, and may not be easily removed. Also, as is evidenced by the reference to Zweigle, when the device attempts to utilize a simpler design, it is subject to slippage and rotation about the frame of the bicycle, which can potentially damage the paint and lead to rust. A device such as that of Zweigle which includes a wrap around plate having a protruding finger, which is held in place by a cord or band, evidences the difficulties with the prior art in that it is difficult to quickly and easily install, particularly by a child, and does not remain in a fixed position when subject to the constant impacts of the spokes of a bicycle.

The present invention is designed specifically to overcome the problems of the prior art. It is simple to install by any individual, including a child, and can easily be removed or repositioned without special tools or the help of an adult. Further, the present invention is adapted to completely conform to the frame of bicycles of varying dimensions, thereby enabling the device to be utilized on new bicycles or to be shared among children on different bicycles. Also, as a result of the resilient gripper inserts, should the dimensions of the bicycle frame be tapered or variable along the section to which the device is to be attached, the device will still completely and securely contact the frame to prevent it from falling off and to prevent slippage or rotation of the noise-making device after repeated impacts from the spokes of a bicycle. Accordingly, the device of the present invention is particularly effective for use by children who cannot follow complicated installation procedures and can become easily discouraged if they constantly have to reorient the device.

SUMMARY OF THE INVENTION

The present invention is directed towards a sound producing device, to be attached to the frame of a bicycle, including a clamp member having a pair of clamp arms. Each of the clamp arms includes a clamp head at one end thereof and a handle portion at an opposite end thereof and are structured to be hingedly and pivotally attached to one another such that the interior portions of the clamp head correspondingly face one another. The clamp arms are pivotally secured to one another by attachment means along their respective mid-sections. Further, biasing means are included to exert a biasing force on the clamp arms resulting in the clamp heads being drawn together unless an internal force is exerted on the handle portions to cause the clamp heads to separate. Disposed on the interior of each of the clamp heads is a gripper insert. Each of the gripper inserts is formed of a high friction, deformable, resilient material adapted to conform with and apply a gripping force to the bicycle frame. Protruding from a distal end, adjacent the clamp head, of at least one of the clamp arms is a substantially rigid, yet flexible flap. This flap is substantially elongate such that when the clamp head is disposed around the forks of the tire holding portion of the bicycle frame, the flap will contact the moving spokes of the bicycle resulting in a motor-like noise being generated while the wheels are turning.

It is an object of the present invention to provide an enjoyable sound-producing device for use with a bicycle which is easy to install and remove by a child.

Yet another object of the present invention is to provide a sound producing device for installation on a bicycle which will not easily rotate, thus requiring reorientation, after repeated impacts with the spokes of the bicycle.

Still another object of the present invention is to provide an easily installed sound producing device which can be utilized with bicycles having frames of varying dimensions.

BRIEF DESCRIPTION OF THE DRAWINGS

For a fuller understanding of the nature of the present invention, reference should be had to the following detailed description taken in combination with the accompanying drawings in which:

FIG. 5 is a perspective view of a second embodiment of the sound producing device.

FIG. 6 is a side view of the second embodiment of the sound producing device.

FIG. 7 is a perspective view of the biasing means of the second embodiment of the sound producing device.

FIG. 8 is a perspective view of a third embodiment of the sound producing device.

FIG. 9 is a side view of the third embodiment of the sound producing device.

FIG. 10 is a partial, cross-sectional view along line 10—10 of FIG. 8.

Like reference numerals refer to like parts throughout the several views of the drawings.

DETAILED DESCRIPTION OF THE PREFERRED EMBODIMENT

Figure 1:
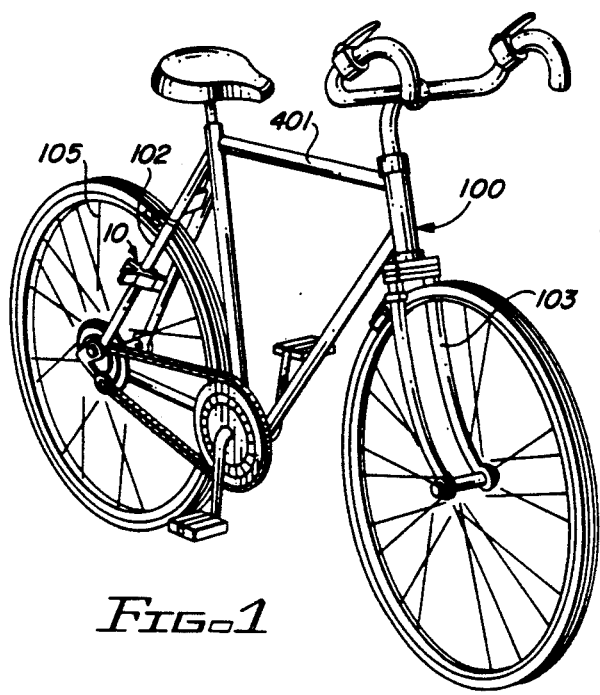
FIG. 1 is a perspective view of the sound producing device attached to a bicycle.

Shown throughout FIGS. 1-10, the present invention is directed towards a sound producing device, generally indicated as 10, to be attached to the frame 101 of a bicycle 100. More particularly, the sound producing device 10 is to be attached at the rear fork 102 or front fork 103 of the bicycle frame 101 such that the sound producing device 10 may contact the spokes 105 of the bicycle 100 to produce a motor-like sound.

Figure 4:
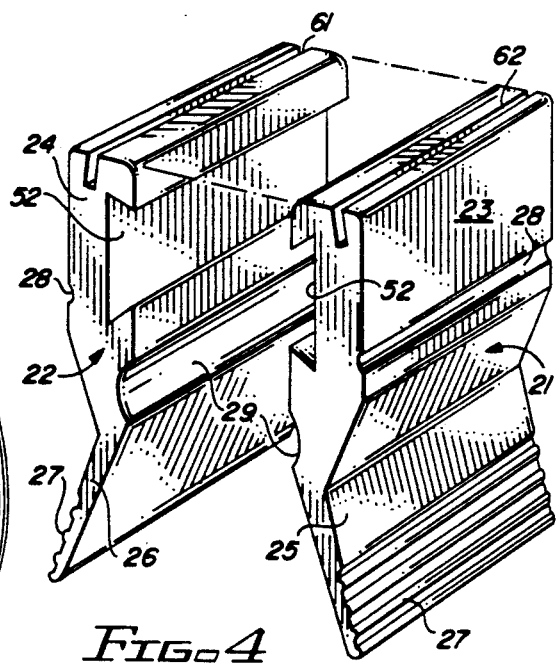
FIG. 4 is an exploded view of the clamp member of the present invention.
Figure 3:
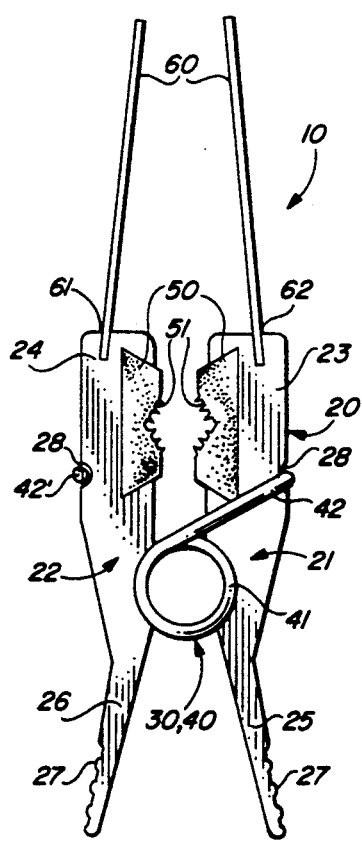
FIG. 3 is a side view of a first embodiment of the sound producing device.
Figure 2:
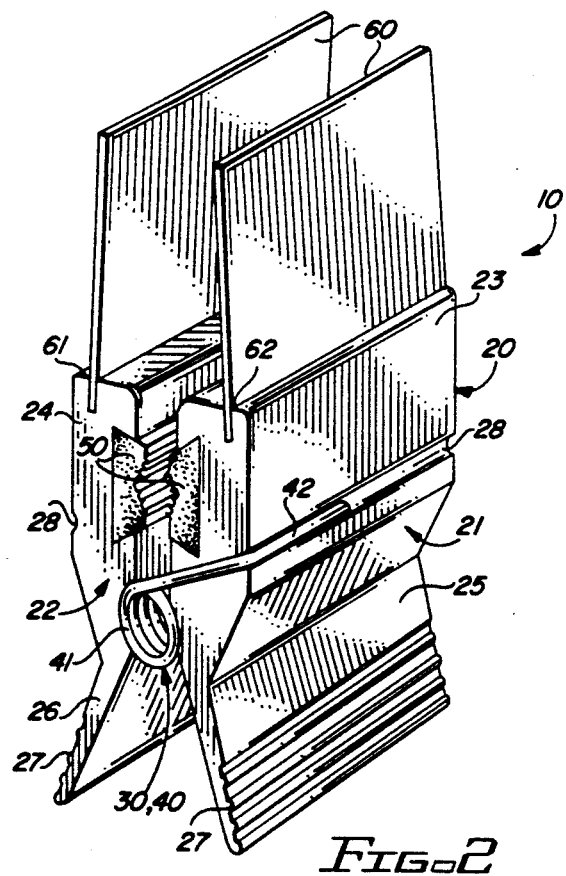
FIG. 2 is a perspective view of the first embodiment of the sound producing device.

As shown in FIGS. 2-3, the sound producing device 10 includes primarily a clamp member 20. The clamp member 20 includes a pair of oppositely disposed clamp arms 21 and 22, each including a clamp head 23 and 24 at a distal end thereof and a handle portion 25 and 26 at proximal ends thereof. Disposed to attach the clamp arms 21 and 22, pivotally together at a mid-section thereof, are attachment means, generally indicated as 30. This attachment means 30 pivotally holds the clamp arms 21 and 22 together while biasing means, generally indicated as 40, exert a biasing force on the clamp arms 21 and 22 such that the clamp heads 23 and 24 are drawn towards each other requiring that a compressing force be exerted on the handle portions 25 and 26 to separate the clamp heads 23 and 24 during attachment or removal to the bicycle 100. The clamp heads 23 and 24 are shown in a slightly separated position throughout the several views of the drawings, however, would normally contact one another when not secured about a rigid object such as the bicycle frame 101. Accordingly, a secure and tight fit about the frame of 101 of the bicycle 100 can be assured. Further included to assure a snug, non-slipping fit on the bicycle frame 101, are a pair of gripper inserts 50. These gripper inserts 50, which are secured within a pair of recesses 52 in an interior of each of the clamp heads 23 and 24, as best seen in FIG. 4, are made of a high friction, deformable material, such that during use the sound producing device 10 will not rotate about its point of attachment to the frame 101 of the bicycle 100 after repeated impacts with the spokes 105, and such that bicycles of varying frame thicknesses or even bicycles having tapered frame portions which vary in diameters will be fully engaged at all points of attachment despite the variation of diameter. Each of the gripper inserts includes a grooved exterior surface 51 to further facilitate a snug and secure fit at all points of contact with the bicycle 100.

Protruding from a distal end, adjacent the clamp heads 23 and 24, of the clamp arms 21 and 22 are a pair of substantially rigid, yet flexible flaps 60. These flaps 60 are ideally made of plastic or a like material which will bend upon contact with the spokes 105 of the bicycle 100, make a substantial noise when struck by the spokes 105 of the bicycle 100, and will return to their original, flat orientation after an impact. In the preferred embodiment, these flaps 60 are secured within a groove 61 or 62 made in the clamp arms 21 and 22. Each groove 61 and 62 extends along an entire length of each clamp arm 21 and 22 and is structured to securely receive an edge of each of the flaps 60 such that the flaps 60 will not slide out of the grooves 61 and 62 during impacts with the spokes 105 of the bicycle 100.

In the first embodiment of the sound producing device 10, detailed in FIGS. 2, 3, and 4, the attachment means 30 and biasing means 40 are both a coil spring 41 having a pair of L-shaped, inwardly bent, elongate extension ends 42 and 42' extending from opposite ends thereof. The coil spring 41 extends along the entire length of the clamp arms 21 and 22 and is positioned between a pair of semi-circular recesses 29 which come together to form a transverse channel wherein the coil spring 41 is held. The coil spring 41 acts as a pivot axis for the clamp arms 21 and 22. The extension ends 42 and 42', which protrude from opposite ends of the coil spring 41 engage an outer surface of a corresponding one of the clamp arms 21 and 22, at the clamp heads 23 and 24 such that an inwardly biasing force is exerted on the clamp heads 23 and 24 causing them to be pushed towards one another. Additionally, the extension ends 42 and 42' function to maintain the clamp arms 21 and 22 together. In order to assure secure engagement by the extension ends 42 and 42' behind the clamp heads 23 and 24, a transverse groove 28 extends across the outer surface of the clamp arms 21 and 22 wherein the extension ends 42 and 42' are positioned. In order to separate the clamp heads 23 and 24, the handle portions 25 and 26 must be compressed towards one another, and accordingly, each of the handle portions 25 and 26 includes a ridged exterior 27 to facilitate gripping thereof during attachment and removal.

Turning to FIGS. 8, 9 and 10, a third embodiment of the sound producing device 10" is shown. This embodiment differs in that the attachment means 30 includes an elongate retainer pin 31 extending through and effectively linkingly attaching mating mid sections of the clamp arms 21 and 22. As shown in FIG. 10, each of the clamp arms 21 and 22 includes a pair of hinge members 32 and 33, and 34 and 35, respectively, protruding from opposite transverse sides of an interior surface of the mid-section of each of the clamp arms 21 and 22. Each of the hinge members 32, 33, 34, and 35 includes an aperture 37, each of the apertures 37 being positioned such that when the hinge members 32, 33, 34 and 35 are interlockingly disposed, the apertures 37 overlap and the retainer pin 31 may pass radially therethrough defining a pivot axis. In order to enable the interlocking fit between the clamp arms 21 and 22, two of the hinge members 32, 33, 34 or 35, in this case 34 and 35, must be spaced inwardly from the outer edge of the clamp arm 22, thereby allowing hinge members 32 and 33 positioned at an outermost edge of the clamp arm 21 to overlap for proper interlocked positioning. This attachment means 30' is also utilized in the second embodiment of the sound producing device 10', shown in FIGS. 5, 6 and 7.

As shown in FIGS. 5, 6 and 7, a second embodiment of the biasing means 40' includes a generally M-shaped, high tension, metallic spring plate 44. The spring plate 44 is secured at an interior of each of the handle portions 25 and 26, and is structured to exert an outwardly biasing force on each of the handle portions 25 and 26, such that the clamp heads 23 and 24 are pushed towards one another requiring a compressing force on the handle portions 25 and 26 to separate them.

A third embodiment of the biasing means 40", shown in FIGS. 8, 9 and 10, includes a coil spring 45 wrapped around the hinge pin 31 and positioned between the innermost hinge members 34 and 35. The coil spring 45 includes pair of opposite free ends 46 and 47 which extend downwardly along an interior of the handle portions 25 and 26. Accordingly, an outwardly biasing force is exerted on the handle portions 25 and 26 causing the clamp heads 23 and 24 to be drawn towards one another.

The present invention as described details the preferred embodiments to accomplish the claimed structure of the sound producing device. However, variations consistent with the intent of the present invention as claimed, and consistent with the doctrine of equivalents, should also be included.

Now that the invention has been described,
What is claimed is:

1. To be attached to the frame of a bicycle, the bicycle frame being of varying dimensions at different sections thereof and the bicycle including at least one tire having a plurality of spokes which move during rotation of the tire, a sound producing device comprising:

a clamp member, said clamp member including a pair of arms, said arms including a clamp head and a handle portion at opposite ends thereof, attachment means structured and disposed to pivotally attach said arms to one another at a mid-section thereof, biasing means structured and disposed to exert a biasing force on said arms such that said clamp heads are normally drawn to one another defining a clamping position, a gripper means disposed in an interior of each of said clamp heads, said gripper means being formed of a high friction, resilient material so as to substantially conform to the varying dimensions of the bicycle frame, while preventing moving of said clamped member relative to the bicycle frame during use, at least one substantially rigid, yet flexible flap protruding from a distal end, adjacent said clamp head, of at least one of said arms, said flap being substantially elongate so as to contact the moving spokes of the bicycle, and an elongate groove disposed in said distal end of each of said clamp arms, said elongate groove being structured and disposed receiving an edge of said flap securely therein.

2. A device as recited in claim 1 including two of said flaps, one protruding from each of said clamp arms.

3. A device as recited in claim 2 wherein said gripper means includes a grooved exterior surface structured to engage and grip the bicycle frame.

4. A device as recited in claim 3 wherein said handle portions include a ridged exterior surface structured and disposed to facilitate gripping and squeezing thereof.

5. A device as recited in claim 4 wherein said attachment means includes an elongate retainer pin extending through and effectively hingedly attaching said midsections of said clamp arms.

6. A device as recited in claim 5 wherein said mid-section of each of said arms includes a pair of hinge members protruding from opposite transverse sides of an interior surface of said mid-section, said hinge members including an aperture therein and being interlockingly disposed such that said apertures overlap on one another and said retainer pin may pass radially therethrough defining a pivot axis.

7. A device as recited in claim 6 wherein said biasing means includes a coil spring wrapped around said retainer pin and having opposite free ends extending downwardly along an interior of said handle portions such that an outward biasing force is exerted on said handle portions.

8. A device as recited in claim 6 wherein said biasing means includes a high tension, metallic spring plate, said plate being generally M-shaped and placing a outward biasing force along said interior of each of said handle portions.

9. A device as recited in claim 4 wherein said attachment means and said biasing means includes a coil spring including a pair of L-shaped, inwardly bent, elongate extension ends extending from opposite ends of said coil spring and each engaging an outer surface of a corresponding one of said clamp arms so as to exert a biasing force thereon.

10. A device as recited in claim 9 wherein said mid-section of each of said clamp arms includes a semi-circular recess extending transversely along the interior thereof, said recesses in each of said clamp arms coming together to form a transverse channel wherein said coil spring is contained.

11. A device as recited in claim 10 wherein said extension ends of said coil spring protrude from said opposite ends of said channel and engage a transverse groove in an exterior surface of each of said clamp heads so as to exert an inwardly biasing force on said clamp heads.

* * * * *